(12) United States Patent
Misawa et al.

(10) Patent No.: US 7,881,837 B2
(45) Date of Patent: Feb. 1, 2011

(54) DIAGNOSTIC APPARATUS AND METHOD

(75) Inventors: Masanori Misawa, Tokyo (JP); Shinya Ishigaki, Tokyo (JP)

(73) Assignee: Hewlett Packard Development Company, L.P., Houston, TX (US)

( * ) Notice: Subject to any disclaimer, the term of this patent is extended or adjusted under 35 U.S.C. 154(b) by 946 days.

(21) Appl. No.: 10/599,529

(22) PCT Filed: Apr. 23, 2004

(86) PCT No.: PCT/JP2004/005931
§ 371 (c)(1),
(2), (4) Date: Sep. 29, 2006

(87) PCT Pub. No.: WO2005/103630
PCT Pub. Date: Nov. 3, 2005

(65) Prior Publication Data
US 2007/0276559 A1 Nov. 29, 2007

(51) Int. Cl.
*G01D 21/00* (2006.01)
*G01M 15/00* (2006.01)

(52) U.S. Cl. .......................................... 701/33; 701/29

(58) Field of Classification Search ....................... None
See application file for complete search history.

(56) References Cited

U.S. PATENT DOCUMENTS 5,297,047 A * 3/1994 Matsuno ..................... 701/107
5,759,156 A * 6/1998 Hayakawa et al. .......... 600/483
6,701,237 B2 * 3/2004 Sebastian et al. ............... 701/43
7,065,960 B2 * 6/2006 Gioannini et al. ............. 60/295

FOREIGN PATENT DOCUMENTS

| DE | 3841089 A1 | 6/1990 |
|---|---|---|
| DE | 19910336 A1 | 9/2000 |
| DE | 19933924 A1 | 11/2000 |
| DE | 10141557 A1 | 6/2003 |
| JP | 7-103055 A | 4/1995 |
| JP | 8-254447 A | 10/1996 |
| JP | 11-118593 A | 4/1999 |

OTHER PUBLICATIONS

German Office Action. German Patent Office, German Patent Application No. 112004002834.5-52, Jan. 20, 2010, (Including English Translation).

* cited by examiner

*Primary Examiner*—Michael J. Zanelli

(57) ABSTRACT

Provided is a diagnostic apparatus easily applied to diagnosis of a small lot product, etc. When measurement data on a measurement object is inputted sequentially, a filter section (408) performs filtering of the measurement data. When new measurement data is employed as diagnosis object data, a statistic processing section (420) updates diagnosis reference data using the new diagnosis object data. A diagnostic section (416) diagnoses the diagnosis object data based on the diagnosis reference data and determines whether an abnormality is present or not. If an abnormality is present, the fact is displayed to a user along with diagnosis results through an UI section (428).

8 Claims, 13 Drawing Sheets

OPERATION DIAGNOSTIC PROGRAM 40

MEASUREMENT VALUE
(REVOLUTION SPEED, TORQUE, HEAT, FUEL CONSUMPTION AMOUNT,
TEMPERATURE/COMPONENT OF EXHAUST GAS, OR THE LIKE)

DATA COLLECTION PROGRAM 30

S14

S18

S20

S24

S28

DIAGNOSTIC APPARATUS AND METHOD

RELATED APPLICATIONS

The present application is a National Phase entry of International Application Number PCT/JP2004/005931, filed Apr. 23, 2004, the disclosure of which is hereby incorporated by reference herein in its entirety.

TECHNICAL FIELD

The present invention relates to a diagnostic apparatus for diagnosing/monitoring an operation and a state change etc. of a measurement object based on a measurement value obtained from the measurement object, and its method.

BACKGROUND ART

For example, Patent Document 1 discloses a method of detecting a fault of a control system by using an operation model.

However, operation models of diagnostic objects, such as operation models of apparatus each to be produced only by one or a small number and an apparatus being developed, may not be obtained.

Accordingly, the method disclosed in Patent Document 1 cannot be applied to such the apparatus.

[Patent Document 1] JP Publication of Unexamined Patent Application S57-041708

DISCLOSURE OF THE INVENTION

Problems to be Solved by the Invention

The present invention has been made in view of the above-mentioned circumstances, and it is an object of the invention to provide a diagnostic apparatus capable of diagnosing/monitoring an operation and an state change or the like of a diagnosis object without using any operation models, and its method.

It is another object of the present invention to provide a diagnostic apparatus to be easily applied to diagnosis of objects having large individual differences, for example, diagnosis objects produced only by a very small number or diagnosis objects being developed, and its method.

Means for Solving the Problems

In order to achieve the above-mentioned object, according to the present invention, a diagnostic apparatus includes: validity determining means for determining whether a measurement value obtained by time-sequentially measuring a measurement object is valid; reference generating means for generating a diagnosis reference used for diagnosing the measurement object by using a measurement value determined to be valid each time the measurement value is determined to be valid; and diagnosing means for diagnosing the measurement object based on the generated diagnosis reference.

Preferably, the diagnostic apparatus further includes state determining means for determining a state of the measurement object by using the measurement value determined to be valid, the measurement object changing among a plurality of states, in which the reference generating means generates the diagnosis reference according to the state of the measurement object.

Preferably, the diagnostic apparatus further includes state determining means for determining a state of the measurement object by using the measurement value determined to be valid, the measurement object changing among a plurality of states, in which the diagnosing means diagnoses the measurement object according to the state of the measurement object.

Preferably, the validity determining means determines a measurement value obtained at timing other than predetermined timing, a measurement value inevitably containing an error when the measurement object is measured, and a measurement value taking a value outside a preset range, or a measurement value other than a combination of any one or more of the measurement values to be valid.

Preferably, the reference generating means generates the diagnosis reference by statistically processing the measurement values of the kinds.

Preferably, the diagnosing means determines the measurement object to be normal when the measurement value is within a predetermined range from a center value of the measurement values obtained by the statistic processing.

Preferably, the diagnosing means determines the measurement object to be normal when the measurement value takes a value outside the predetermined range from the center value of the measurement values by a predetermined number of times or more and by a predetermined frequency or more, or in a case other than one of these cases.

Further, according to the present invention, a transport machine includes: transport means including a component to be a measurement object; validity determining means for determining whether a measurement value obtained by time-sequentially measuring a measurement object is valid; reference generating means for generating a diagnosis reference used for diagnosing the measurement object by using a measurement value determined to be valid each time the measurement value is determined to be valid; and diagnosing means for diagnosing the measurement object based on the generated diagnosis reference.

Further, according to the present invention, a diagnostic method includes: determining whether a measurement value obtained by time-sequentially measuring a measurement object is valid; generating a diagnosis reference used for diagnosing the measurement object by using a measurement value determined to be valid each time the measurement value is determined to be valid; and diagnosing the measurement object based on the generated diagnosis reference.

Further, according to the present invention, a program causes a computer to execute: a validity determining step of determining whether a measurement value obtained by time-sequentially measuring a measurement object is valid; a reference generating step of generating a diagnosis reference used for diagnosing the measurement object by using a measurement value determined to be valid each time the measurement value is determined to be valid; and a diagnosing step of diagnosing the measurement object based on the generated diagnosis reference.

EFFECTS OF THE INVENTION

According to the diagnostic apparatus of the present invention and its method, it is possible to diagnose a diagnosis object without using any operation models.

The diagnostic apparatus of the present invention and its method can be easily applied to diagnosis/monitoring of objects having large individual differences, for example, diagnosis objects produced only by a very small number or diagnosis objects being developed.

BEST MODES FOR CARRYING OUT THE INVENTION

First Embodiment

A first embodiment of the present invention will be described below.

[Operation Diagnostic System 1]

Figure 1:
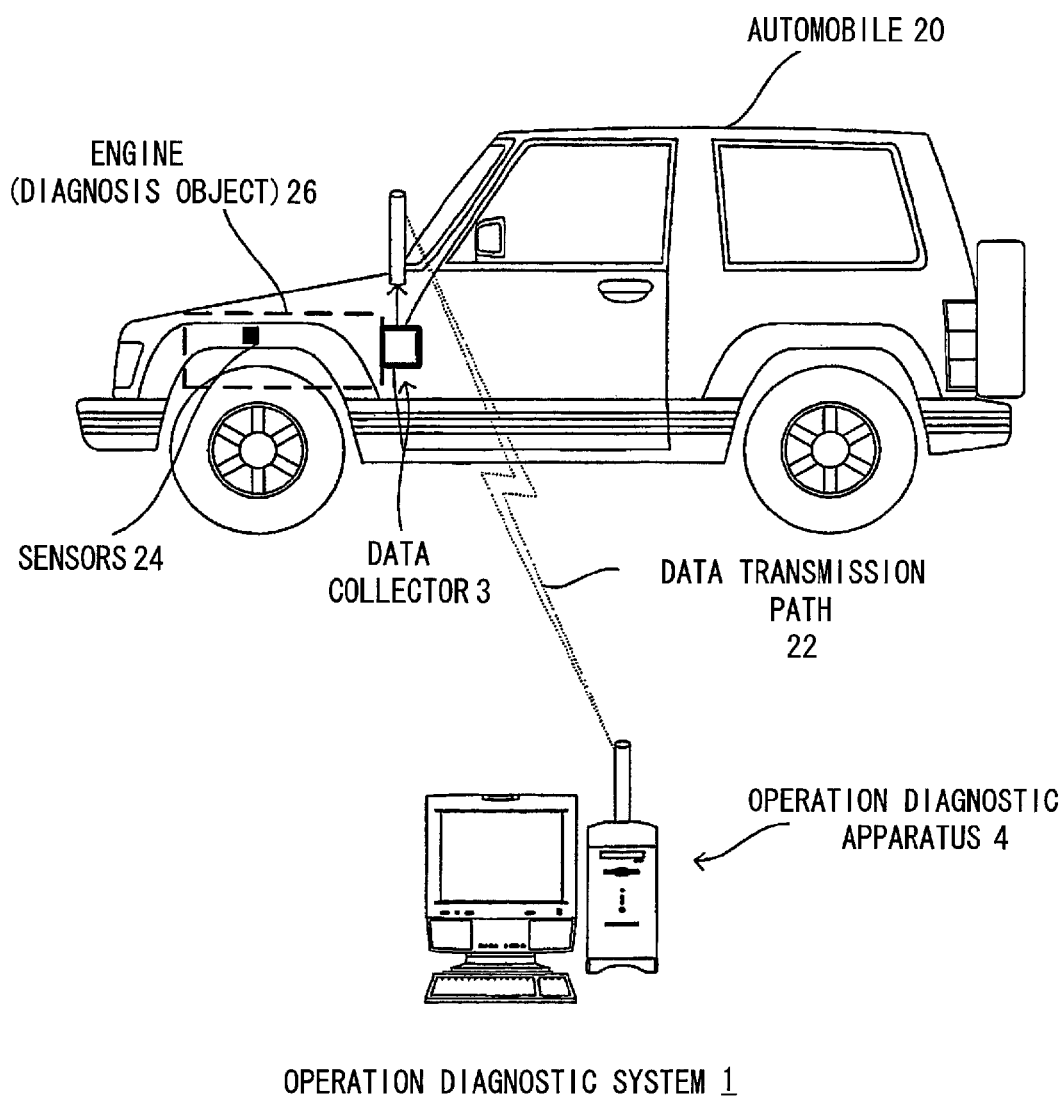
FIG. 1 is a diagram showing an operation diagnostic system according to the present invention.

FIG. 1 is a diagram showing an operation diagnostic system 1 according to the present invention.

Substantially same components among components shown in the drawings will be denoted below by same reference numerals.

As shown in FIG. 1, an operation diagnostic system 1 includes a data collector 3 and an operation diagnostic apparatus 4 connected via a wire or wireless data transmission line 22.

The operation diagnostic system 1 can be applied to various transport machines by mounting a sensor to a component such as an engine of an aircraft or a ship in addition to an automobile. For clearer and more specific explanation, a case of applying the operation diagnostic system 1 to the automobile will be described below as a specific example.

The operation diagnostic system 1 can be applied to various purposes which need automatic operation diagnosis/automatic state monitoring, such as diagnosing as to whether an individual product operates normally, diagnosing as to whether generation of a desired chemical compound has been successful, and automatic abnormality monitoring of an inpatient in a medical field. For more specific and clearer explanation, a case of applying the operation diagnostic system 1 to diagnosis of an engine 26 of an automobile 20 will be described below as a specific example.

Through those components, for example, the operation diagnostic system 1 is mounted to various parts of the engine 26 of the automobile 20 to be diagnosed, and processes measurement data obtained from one or more sensors 24 for measuring a revolution speed, torque, a temperature, a fuel consumption amount of the engine 26, a temperature/component of an exhaust gas, and the like to diagnose an operation or the like of the engine 26.

[Hardware Configuration]

Figure 2:
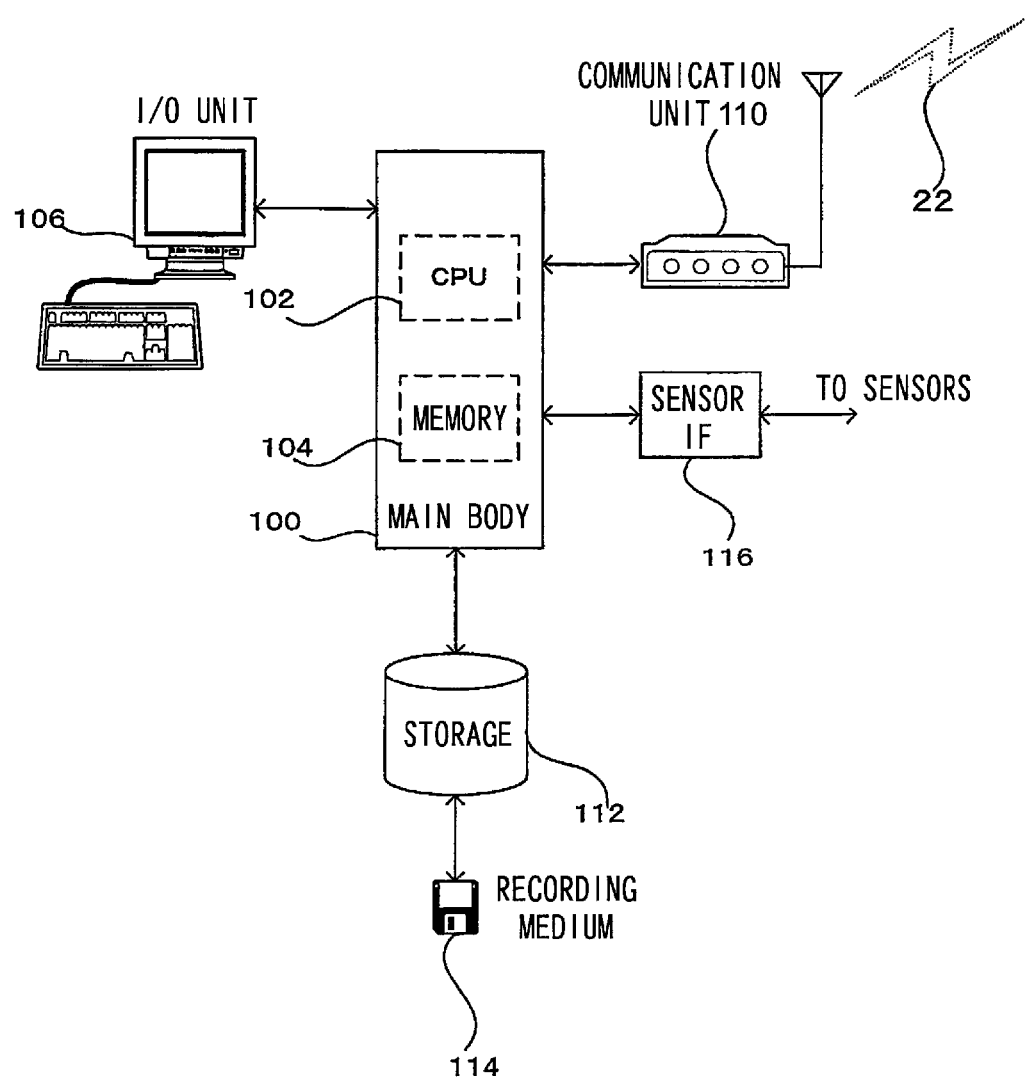
FIG. 2 is a diagram showing an example of a hardware configuration of a data collector and an operation diagnostic apparatus shown in FIG. 1.

FIG. 2 is a diagram showing an example of a hardware configuration of the data collector 3 and the operation diagnostic apparatus 4 which are shown in FIG. 1.

As shown in FIG. 2, the data collector 3 and the operation diagnostic apparatus 4 include a main body 100 including a CPU 102 and a memory 104, an I/O unit 106 such as a LCD display unit and a keyboard etc., a communication unit 110 for performing mutual communication via the data transmission line 22, and a storage 112 such as an HDD unit or a CD unit.

Additionally, a sensor interface (sensor IF) 116 is added to the data collector 3 to provide an interface function between the sensors 24 mounted to the engine 26 (FIG. 1) and the main body 100.

In other words, the data collector 3 and the operation diagnostic apparatus 4 have a configuration as a computer which has necessary functions such as a mutual communication function via the data transmission line 22.

[Data Collection Program 30]

Figure 3:
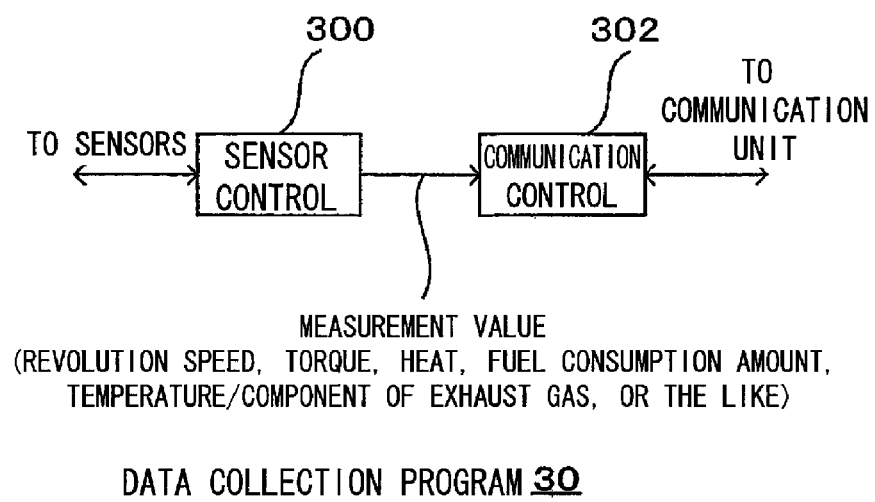
FIG. 3 is a diagram showing a data collection program operated on the data collector shown in FIGS. 1 and 2.

FIG. 3 is a diagram showing a data collection program 30 operated on the data collector 3 shown in FIGS. 1 and 2.

As shown in FIG. 3, the data collection program 30 includes a sensor control section 300 and a communication control section 302.

For example, the data collection program 30 is supplied to the data collector 3 via a storage medium 114, and loaded to a memory 104 to be executed (the same holds true for each program hereinafter)

In the data collection program 30, the data collection program 30 controls the sensors 24 mounted to the engine 26 to read a measurement value periodically or according to polling from the operation diagnostic apparatus 4.

The sensor control section 300 transmits the read measurement value as measurement data to the operation diagnostic apparatus 4 via the communication control section 302 and the data transmission line 22.

The communication control section 302 performs control necessary for communication with the operation diagnostic apparatus 4.

[Operation Diagnostic Program 40]

Figure 4:
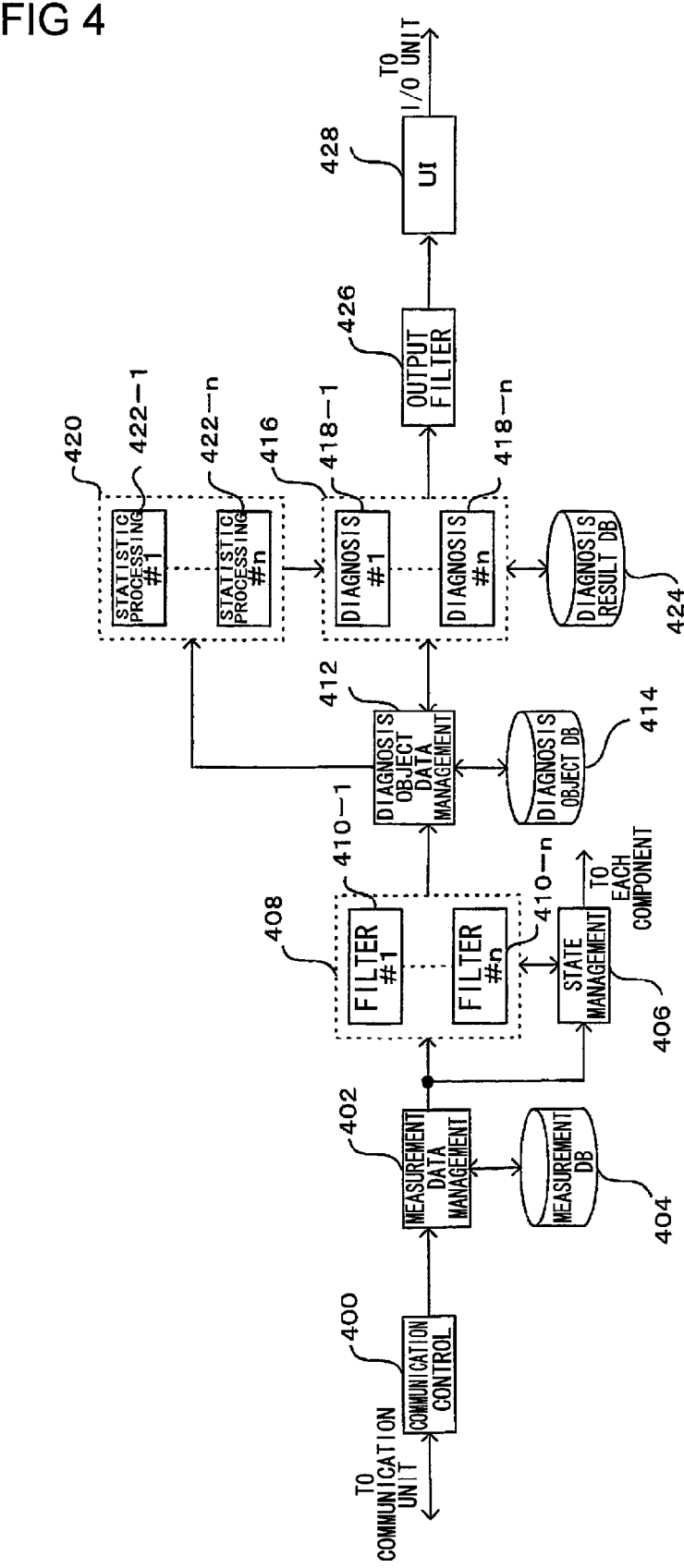
FIG. 4 is a diagram showing a first operation diagnostic program operated on the operation diagnostic apparatus shown in FIGS. 1 and 2.

FIG. 4 shows a first operation diagnostic program 40 operated on the operation diagnostic apparatus 4 shown in FIGS. 1 and 2.

As shown in FIG. 4, the operation diagnostic program 40 includes a communication control section 400, a measurement data management section 402, a measurement database (measurement DB) 404, a state management section 406, a filter section 408, a diagnosis object data management section 412, a diagnosis object DB 414, a diagnostic section 416, a statistic processing section 420, a diagnosis result DB 424, an output filter section 426, and a user interface section (UI section) 428.

The filter section 408, the operation diagnostic apparatus 418, and the statistic processing section 420 respectively include filter modes #1 (410-1) to #n (410-$n$), diagnostic modes #1 (418-1) to #n (418-$n$), and statistic processing modes #1 (422-1) to #n (422-$n$) corresponding to states #1 to #n described below with reference to FIG. 5.

A plurality of components such as the filter modes 410-1 to 410-$n$ may collectively be abbreviated to a filter mode 410 below.

In the drawings and their descriptions below, n will simply denote an integer of 1 or more (n is not always the same numeral).

Through these components, the operation diagnostic program 40 processes the measurement data sent from the data collector 3 to diagnose an operation or the like of the engine 26 (FIG. 1).

In the operation diagnostic program 40, the communication control section 40 controls communication with the data collector 3.

The measurement data management section 402 receives the measurement data from the data collector 3 to store and to manage the data in the measurement DB 404.

The measurement data management section 402 outputs the measurement data stored in the measurement DB 404 to the state management section 406 and the filter section 408 when necessary.

Figure 5:
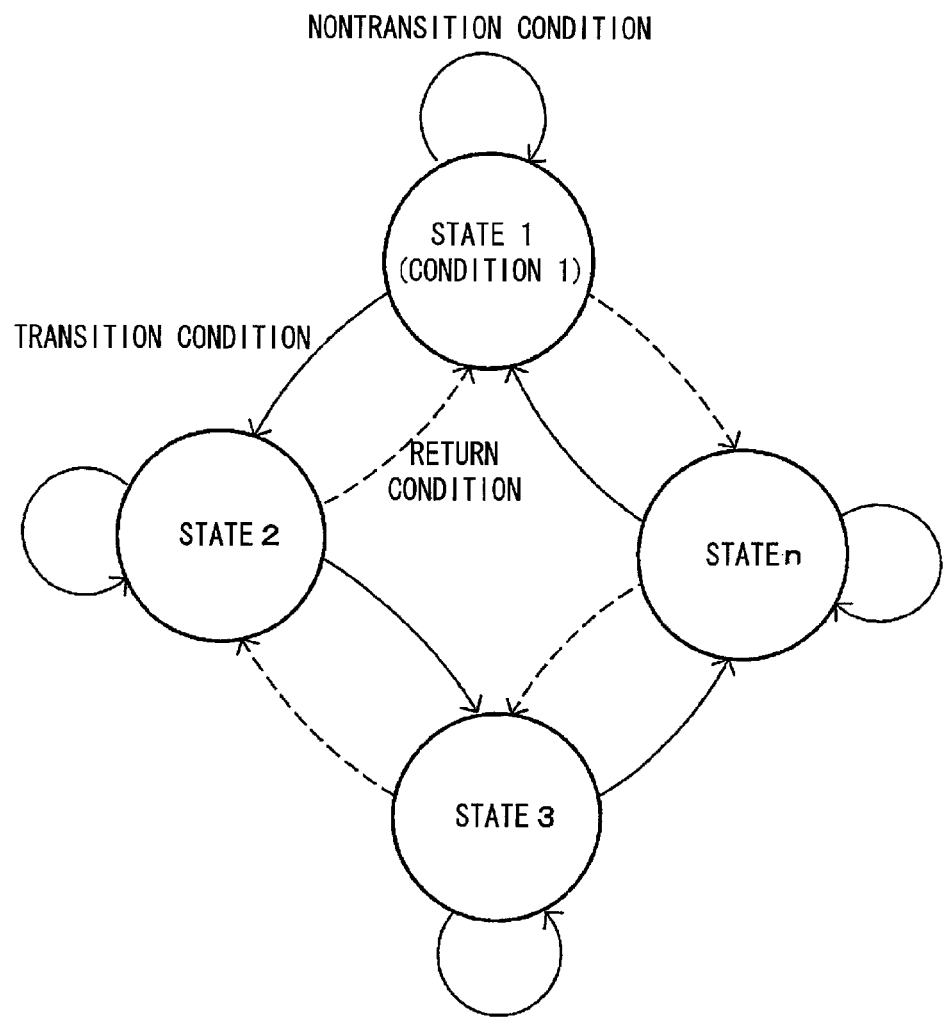
FIG. 5 is a diagram showing an example of a state of an engine (FIG. 1).

FIG. 5 is a diagram showing an example of a state of the engine 26 (FIG. 1). The state management section 406 determines which of states shown in FIG. 5 the engine 26 is in, and executes, depending on the state of the engine 26, switching among the filter mode 410 of the filter section 408, the diagnostic mode 418 of the diagnostic section 416, and the statistic processing mode 422 of the statistic processing section 420.

As shown in FIG. 5, when operated on the automobile 20, the engine 26 has a plurality of states (states 1 to n; n>2) such as idling, low-speed traveling, high-speed traveling, and decelerating.

A state determined by the state management section 406 is a state only for diagnosis, and thus does not always match a state of the engine 26.

The state management section 406 determines which of the states the operation of the engine 26 is in at this time based on the measurement data from the data collector 3.

The state management section 406 controls the filter section 408, the diagnostic section 416, and the statistic processing section 420 to execute processing under operation conditions (filter mode 410, diagnostic mode 418, and statistic processing mode 422) set for the operation state of the engine 26 which has been obtained as a determination result.

Then, when new measurement data does not satisfy a transition condition to another state or when the new measurement data satisfies a condition (nontransition condition) of nontransition from the state to another state, the state management section 406 does not change the operation conditions of the filter section 408, the diagnostic section 416, and the statistic processing section 420 determining that the operation of the engine 26 is kept in the same state.

Then, when the new measurement data satisfies the transition condition to another state, determining that the operation of the engine 26 has changed to another state, the state management section 406 changes the operation conditions of the filter section 408, the diagnostic section 416, and the statistic processing section 420 so as to execute processing under operation conditions set for the state after the transition.

When the operation of the engine 26 is in another state and subsequent new measurement data satisfies a transition condition (return condition) to an original state, determining that the operation of the engine 26 has changed to the original state, the state management section 406 changes the operation conditions of the filter section 408, the diagnostic section 416, and the statistic processing section 420 so as to execute processing under operation conditions set for the original state.

Figure 6:
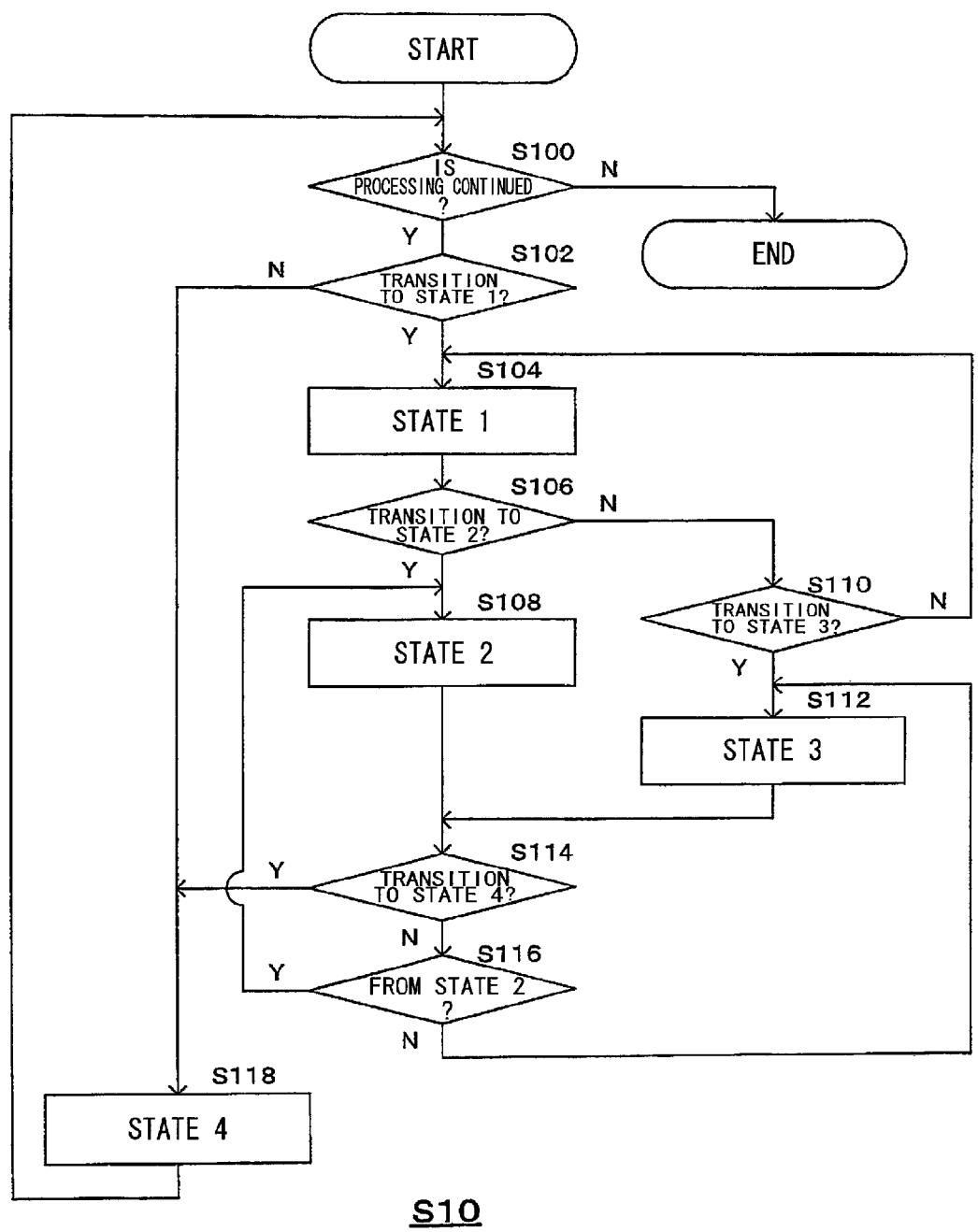
FIG. 6 is a flowchart showing an example of an operation (S10) of a state management section of the first operation diagnostic program shown in FIG. 4.

FIG. 6 is a flowchart showing an example of an operation (S10) of the state management section 406 in the first operation diagnostic program 40 shown in FIG. 4.

Taking a specific example of a case shown in FIG. 6, the operation of the state management section 406 will be further described.

As shown in FIG. 6, in Step 100 (S100), the state management section 406 determines whether to finish processing.

The state management section 406 proceeds to processing of S102 in a case other than the case of finishing the processing.

In Step 102 (S102), the state management section 406 determines whether the measurement data from the data collector 3 satisfies a transition condition (e.g., revolution speed and torque of the engine 26 are equal to or less than certain values) to a state 1 (e.g., idling state).

The state management section 406 proceeds to processing of S104 when the measurement data from the data collector 3 satisfies the transition condition to the state 1, and to processing of Step S118 otherwise.

In Step 104 (S104), the state management section 406 determines that the engine 26 is in the state 1, and sets the filter section 408, the diagnostic section 416, and the statistic processing section 420 to operations conditions (filter mode 410-1, diagnostic mode 418-1, and statistic processing mode 422-1) of the state 1.

In Step 106 (S106), the state management section 406 determines whether the measurement data from the data collector 3 satisfies a transition condition (e.g., revolution speed and torque of the engine 26 become values within predetermined ranges) to a state 2 (e.g., low-speed traveling state).

The state management section 406 proceeds to processing of S108 when the measurement data from the data collector 3 satisfies the transition condition to the state 2, and to processing of Step S110 otherwise.

In Step 108 (S108), the state management section 406 determines that the engine 26 is in the state 2, and sets the filter section 408, the diagnostic section 416, and the statistic processing section 420 to operations conditions (filter mode 410-2, diagnostic mode 418-2, and statistic processing mode 422-2) of the state 2.

In Step 110 (S110), the state management section 406 determines whether the measurement data from the data collector 3 satisfies a transition condition (e.g., revolution speed and torque of the engine 26 become values within predetermined ranges) to a state 3 (e.g., high-speed traveling state).

The state management section 406 proceeds to processing of S112 when the measurement data from the data collector 3 satisfies the transition condition to the state 3, and return to the processing of Step S104 otherwise.

In Step 112 (S112), the state management section 406 determines that the engine 26 is in the state 3, and sets the filter section 408, the diagnostic section 416, and the statistic processing section 420 to operations conditions (filter mode 410-3, diagnostic mode 418-3, and statistic processing mode 422-3) of the state 3.

In Step 114 (S114), the state management section 406 determines whether the measurement data from the data collector 3 satisfies a transition condition (e.g., revolution speed and torque of the engine 26 are inclined to be reduced) to a state 4 (e.g., decelerating state).

The state management section 406 proceeds to processing of S118 when the measurement data from the data collector 3 satisfies the transition condition to the state 4, and returns to the processing of Step S116 otherwise.

In Step 116 (S116), the state management section 406 determines whether the processing of S114 has been executed after the processing of S108.

The state management section 406 returns to the processing of S108 if the processing of S114 has been executed after the processing of S108, and to the processing of S112 otherwise.

In Step 118 (S118), the state management section 406 determines that the engine 26 is in the state 4, and sets the filter section 408, the diagnostic section 416, and the statistic processing section 420 to operations conditions (filter mode 410-4, diagnostic mode 418-4, and statistic processing mode 422-4) of the state 4.

The filter section 408 (FIG. 4) filters the measurement data input from the measurement data management section 402 in the filter mode 410 set for each operation state of the engine 26 under control of the state management section 406.

The filter section 408 outputs the measurement data which has satisfied the filter mode 410 as diagnosis object data used for diagnosis to the diagnosis object data management section 412.

In the filter section 408, a filter mode 410 different from one state to another, or a filter mode 410 common among a plurality of states may be used (the same holds true for the diagnostic mode 418 and the statistic processing mode 422).

The following items (1) to (4) can be cited as examples of the filter modes 410 (filtering conditions):

(1) kind of measurement data to be set as a diagnosis object;

(2) range of measurement values determined to be normal and used for diagnosis;

(3) removal of measurement data of a failed sensor 24 from measurement data to be used for diagnosis, when one of the sensors 24 failing; and (4) timing of measurement data to be set as a diagnosis object.

Figure 7:
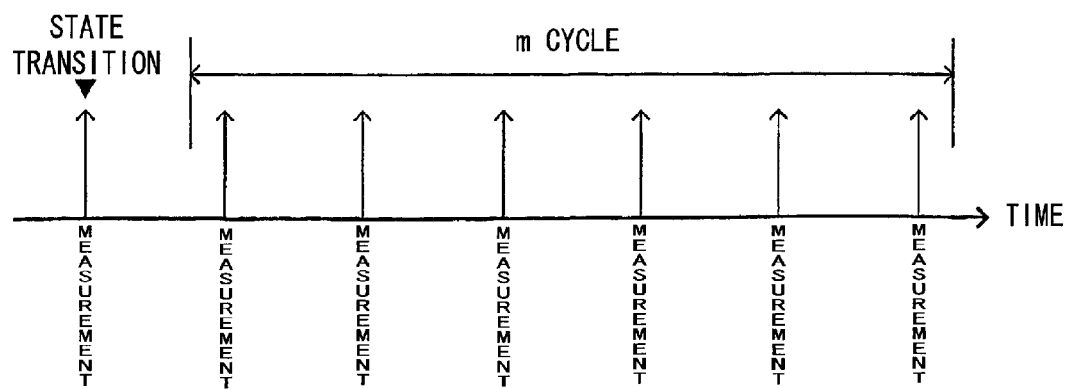
FIG. 7 is a diagram showing an example of timing of measurement data as a diagnosis object.

FIG. 7 is a diagram showing an example of timing of measurement data as a diagnosis object.

As shown in FIG. 7, the timing of the measurement data mentioned in the above-mentioned item (4) indicates that when the state management section 406 detects transition of an operation state of the engine 26 at given timing, the statistic processing section 420 and the diagnostic section 416 do not set measurement data of its cycle as a statistic processing object or a diagnosis object but set measurement data of a subsequent m cycle (m≧1) or a subsequent latest m cycle as a statistic processing object and a diagnosis object.

The cycle in this case includes, in addition to a cycle of measurement by the data collector 3, various cycles to be identified by the data collector 3 and the operation diagnostic apparatus 4 such as a traveling cycle of the automobile 20 on a round course.

Accordingly, for example, according to the filter mode 410 set for each state of the engine 26, the filter section 408 sets a kind of measurement data to be diagnosed and within a range to be determined normal, which is not measurement data generated by the failed sensor 24 but measurement data obtained by predetermined timing, as diagnosis object data.

The diagnosis object data management section 412 (FIG. 4) receives the diagnosis object data input from the filter section 408, and stores and manages the data in the diagnosis object DB 414.

The diagnosis object data management section 412 outputs the diagnosis object data stored in the diagnosis object DB 414 to the diagnostic section 416 and the statistic processing section 420.

Under control of the state management section 406, by a statistic processing mode 422 set for each operation state of the engine 26, the statistic processing section 420 statistically processes the diagnosis object data input from the diagnosis object data management section 412, generates diagnosis reference data for each operation state of the engine 26, and outputs the diagnosis reference data to the diagnostic section 416.

In the statistic processing mode 422 of each operation state of the engine 26, setting is made as to statistic processing (least square method/distribution center of gravity) with respect to the diagnosis object data which should be executed by the statistic processing section 420, and a range in which measurement data is determined to be normal with respect to a center value obtained by the statistic processing, and the like.

Figure 8:
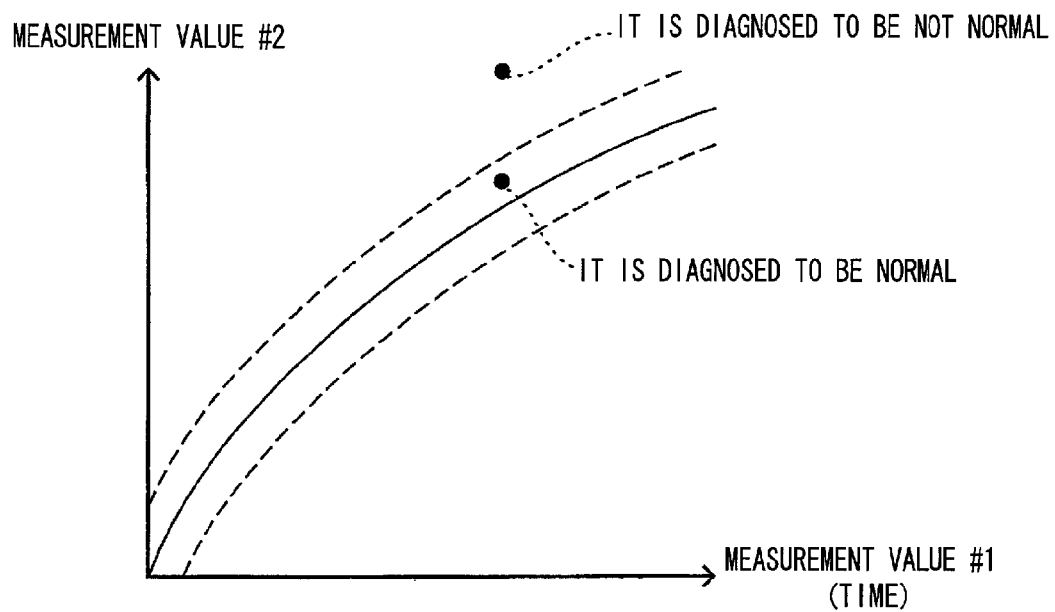
FIG. 8 is a first diagram showing an example of diagnosis reference data generated by a statistic processing section shown in FIG. 4.
Figure 9:
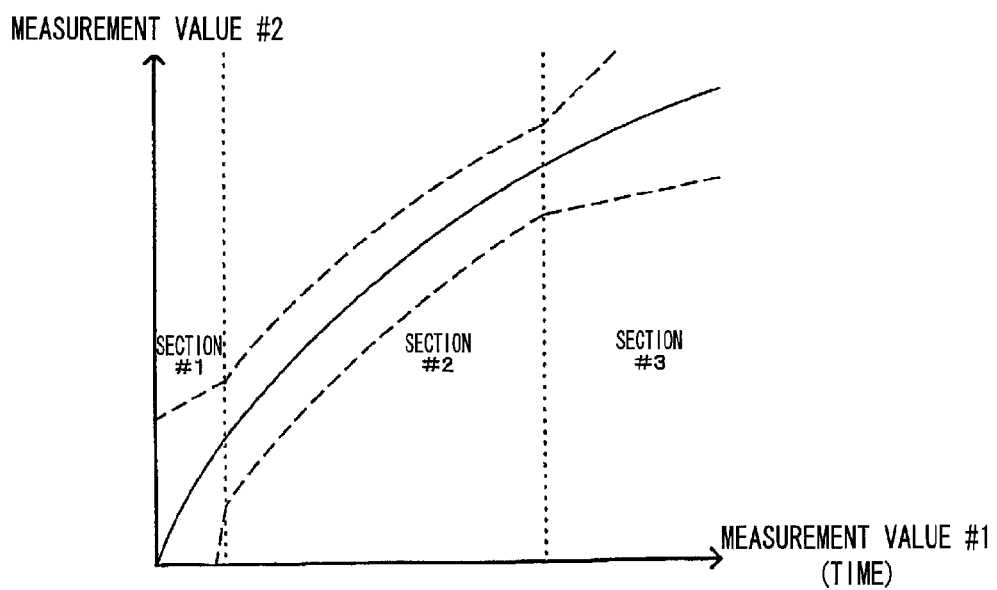
FIG. 9 is a second diagram showing an example of diagnosis reference data generated by the statistic processing section shown in FIG. 4.

FIGS. 8 and 9 are first and second diagrams showing examples of diagnosis reference data generated by the statistic processing section 420 shown in FIG. 4.

In other words, for example, according to conditions set for each state of the engine 26, the statistic processing section 420 statistically processes two or more kinds of diagnosis object data (e.g., engine revolution speed and temperature), or one or more kinds of diagnosis object data (e.g., revolution speed) changed with time to obtain a center value indicated by a solid line in FIG. 8.

Additionally, the statistic processing section 420 sets a range of errors with respect to the obtained center value as indicated by dotted lines in FIG. 8 according to the conditions set for each state of the engine 26.

The statistic processing section 420 outputs the center value and the range of errors shown in FIG. 8 to the diagnostic section 416, as diagnosis reference data.

For example, when diagnosis object data are not collected by a volume enough to be an object of statistic processing even after a passage of a designated cycle (e.g., m; FIG. 7), for example, when the engine 26 is in a special state, and many of measurement data are not set as diagnosis objects by the filter section 408, the statistic processing section 420 performs statistic processing for the first time after a sufficient volume of diagnosis object data is collected.

Among the diagnosis reference data, all the ranges of errors set with respect to the center value do not need to be uniform. As shown in FIG. 9, ranges of errors may be set by methods different from one range to another.

Under control of the state management section 406, by a diagnostic mode 418 set for each operation state of the engine 26, the diagnostic section 416 diagnoses the diagnosis object data input from the diagnosis object data management section 412 by using the diagnosis reference data (FIGS. 8 and 9)

input from the statistic processing section 420, and stores and manages a diagnosis result in the diagnosis result DB 424.

The diagnostic section 416 outputs the diagnosis result stored in the diagnosis result DB 424 to the UI section 428.

In the diagnostic mode 418, upon determination of the number of times or a frequency with which the diagnosis object data becomes outside a normal range indicated by the diagnosis reference data, the diagnostic section 416 diagnoses that the operation of the engine 26 is abnormal (not normal). Such data is set for each operation state of the engine 26.

In other words, the diagnostic section 416 compares the diagnosis object data with the diagnosis reference data, and determines the operation of the engine 26 to be abnormal when the diagnosis object data is outside the range of errors (FIGS. 8 and 9) indicated by the diagnosis reference data with the number of times or the frequency set for each state.

The output filter section 426 further filters the diagnosis result output from the diagnostic section 416 to output the diagnosis result to the UI section 428.

As examples of filtering by the output filter section 426, the following processes (1) and (2) can be cited.

(1) When the same diagnosis result is continuously output from the diagnostic section 416 by a predetermined number of times, this diagnosis result is output as a correct result to the UI section 428. Alternatively, (2) When the same diagnosis result is output from the diagnostic section 416 at a predetermined frequency, this diagnosis result is output as a correct result to the UI section 428.

The UI section 428 displays the filtered determination result input from the output filter section 426 in the I/O unit 106 (FIG. 2) to show the filtered determination result input to a user.

The UI section 428 receives user's operation to the I/O unit 106, and controls an operation of each component of the operation diagnostic program 40, or executes setting for the filter mode 410, the diagnostic mode 418, and the statistic processing mode 422.

[Overall Operation]

An overall operation of the operation diagnostic system 1 to which the first operation diagnostic program 40 is applied will be described below.

Figure 10:
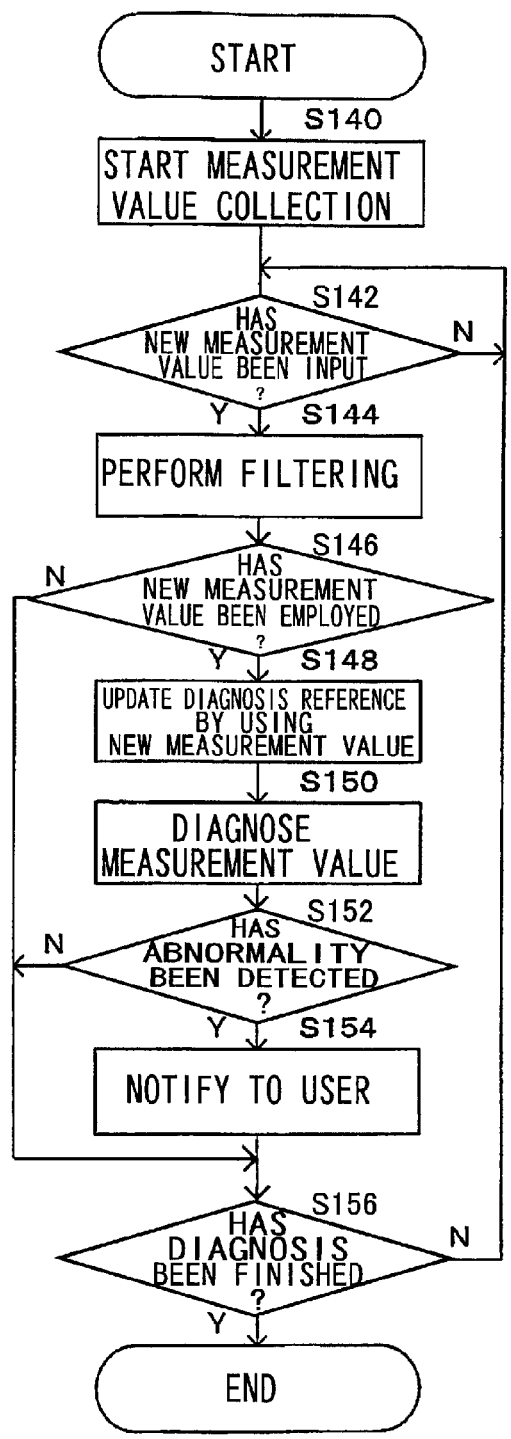
FIG. 10 is a flowchart showing an overall operation (S14) of the operation diagnostic system when there is no transition between states in the engine (FIG. 1).

FIG. 10 is a flowchart showing the overall operation (S14) of the operation diagnostic system 1 when there is no transition between states in the engine 26 (FIG. 1).

In the drawings below, a case of updating a diagnosis reference by m pieces of latest diagnosis object data will be described as a specific example, and processing until collection of m pieces of first diagnosis object data will be omitted.

In Step 140 (S140), the data collector 3 starts collecting various measurement values of the engine 26 (FIG. 1), and sequentially transmits the data as measurement data to the operation diagnostic apparatus 4.

In Step 142 (S142), the measurement data management section 402 (FIG. 4) of the operation diagnostic program 40 determines whether new measurement data has been input.

The operation diagnostic program 40 proceeds to S144 if the new measurement data has been input, but stays in the processing of S142 otherwise.

In Step 144 (S144), the filter section 408 filters the input measurement data.

In Step 146 (S146), the diagnosis object data management section 412 determines whether the new measurement data has been employed as diagnosis object data.

The operation diagnostic program 40 proceeds to S148 if the new measurement data has been employed as diagnosis object data, but to processing of S156 otherwise.

In Step 148 (S148), the statistic processing section 420 updates the diagnosis reference data (FIGS. 8 and 9) by using the new diagnosis object data.

In Steps 150 and 152 (S150 and S152), the diagnostic section 416 diagnoses the diagnosis object data based on the diagnosis reference data to determine whether conditions (e.g., diagnosis object data is outside a range of inhibited reference data with a predetermined number of times/frequency) for detecting abnormalities are satisfied.

The operation diagnostic program 40 diagnoses the diagnosis object data, and proceeds to processing of S154 when the conditions for detecting abnormalities are satisfied, but to processing of S156 otherwise.

In Step 154 (S154), the diagnostic section 416 displays an occurrence of an abnormality of the engine 26 and, as occasion demands, the diagnosis result, the measurement data, the diagnosis object data, and the like to the user via the UI section 428 and the I/O unit 106 (FIG. 2).

In Step 156 (S156), the UI section 428 determines whether to finish the diagnosis.

The operation diagnostic program 40 returns to the processing of S142 when the diagnosis is not finished.

Next, the overall operation of the operation diagnostic system 1 when transition between the states of the engine 26 is taken into consideration will be described.

Figure 11:
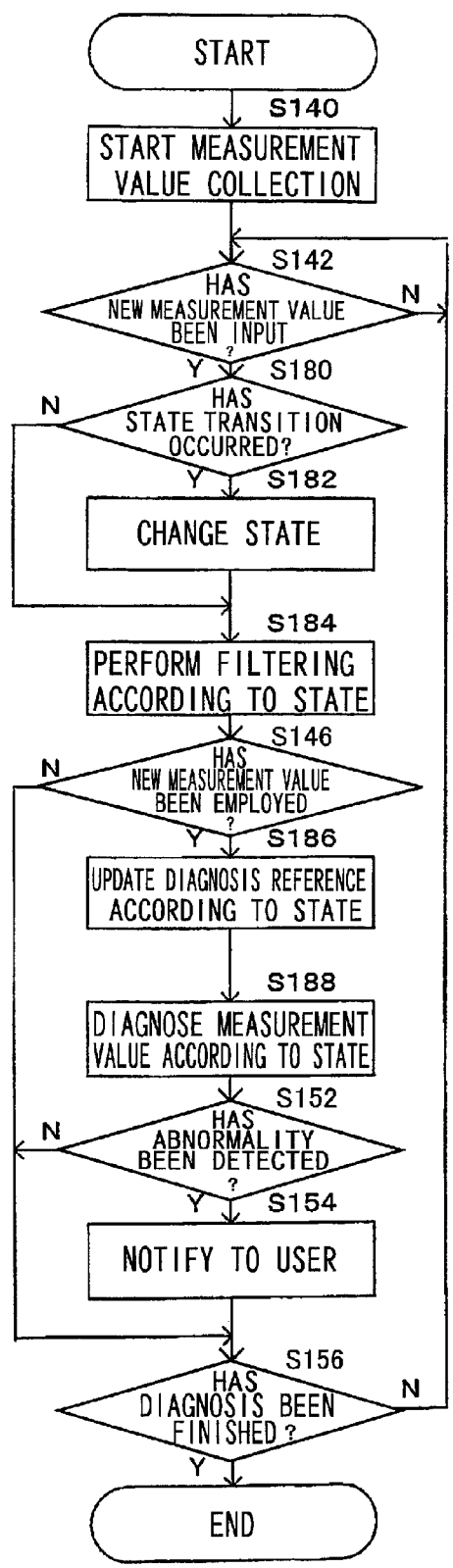
FIG. 11 is a flowchart showing an overall operation (S18) of the operation diagnostic system when there is transition between states in the engine (FIG. 1).

FIG. 11 is a flowchart showing the overall operation (S18) of the operation diagnostic system 1 when there is transition between the states of the engine 26 (FIG. 1).

Among steps shown in FIG. 11, steps substantially similar to those shown in FIG. 10 are denoted by similar reference numerals.

As shown in FIG. 11, in Step 180 (S180), the state management section 406 determines whether transition (FIGS. 5 and 6) has occurred between the states of the engine 26.

The operation diagnostic program 40 proceeds to processing of S182 if the transition (FIGS. 5 and 6) has occurred between the states of the engine 26, but to processing of S182 otherwise.

In Step 182 (S182), the state management section 406 sets the filter section 408, the diagnostic section 416, and the statistic processing section 420 to perform processing under conditions (filter mode 410, diagnostic mode 418, and statistic processing mode 422) set for the state of the transition destination.

In Step 184 (S184), according to the set filter mode 410, the filter section 408 filters the input new measurement data.

In Step 186 (S186), according to the set statistic processing mode 422, the statistic processing section 420 generates diagnosis reference data.

In Step 188 (S188), according to the set diagnosis mode 418, the diagnostic section 416 diagnoses the diagnosis object data.

Second Embodiment

A diagnostic apparatus capable of performing parallel operation diagnoses for the plurality of states shown in FIG. 5 or the like according to a second embodiment of the present invention will be described below.

To realize parallel diagnoses for the plurality of states, in the operation diagnostic apparatus 4 (FIGS. 1 and 2), a second operation diagnostic program 50 below is executed in place of the first operation diagnostic program 40 (FIG. 4).

[Operation Diagnostic Program 50]

Figure 12:
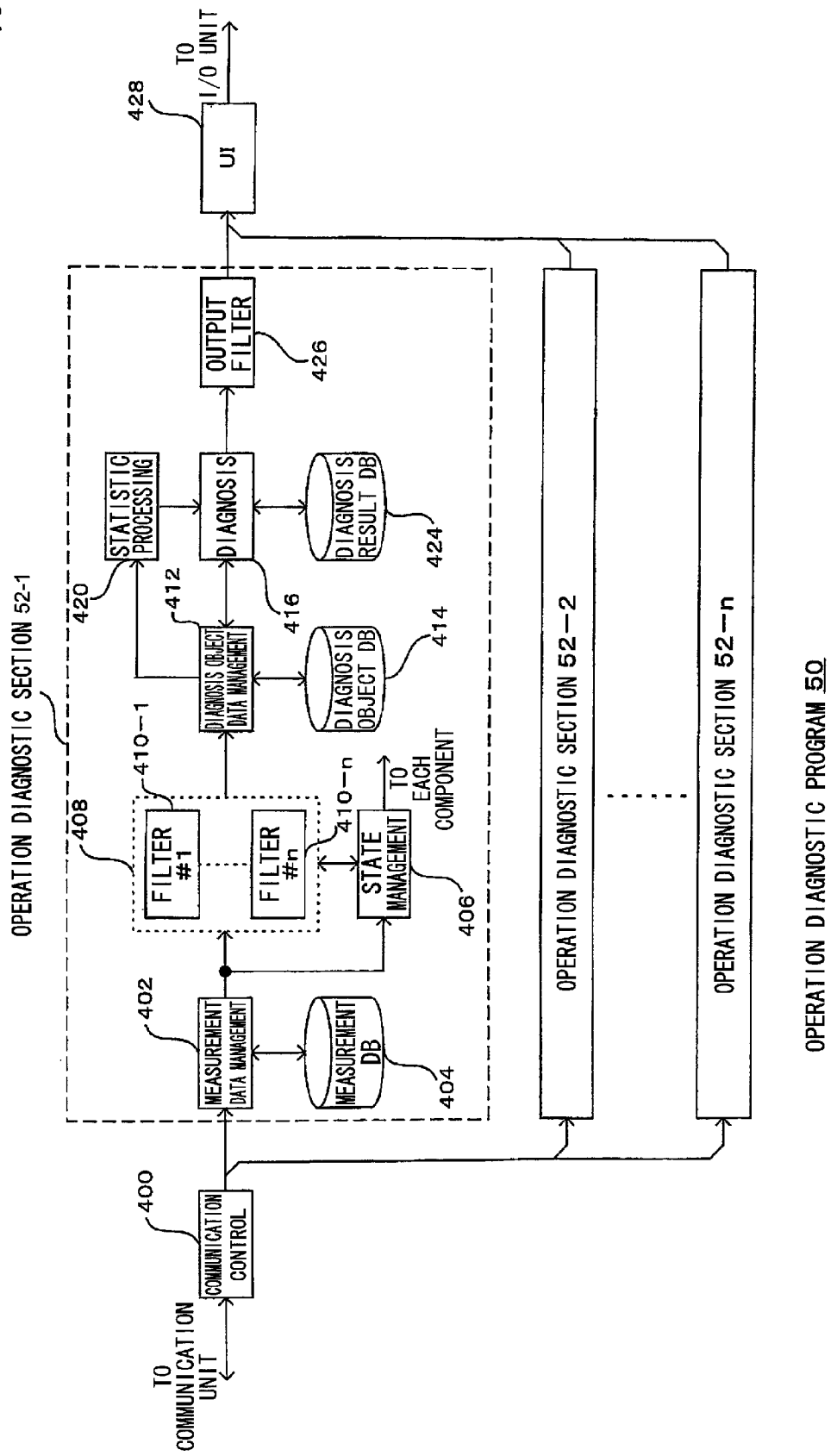
FIG. 12 is a diagram showing a structure of a second operation diagnostic program executed in place of the first operation diagnostic program shown in FIG. 4 in the operation diagnostic apparatus shown in FIGS. 1 and 2.

FIG. 12 is a diagram showing a structure of the second operation diagnostic program 50 executed in place of the first operation diagnostic program 40 shown in FIG. 4 in the operation diagnostic apparatus 4 shown in FIGS. 1 and 2.

As shown in FIG. 12, for example, the operation diagnostic program 50 includes operation diagnostic sections 52-1 to 52-n which are disposed for each state to be subjected to operation diagnosis, such as the states of the engine 26 shown in FIG. 5 or states separately defined for operation diagnosis and which are operated in parallel, and a UI section 428.

Each operation diagnosis section 52 includes a communication control section 400, a measurement data management section 402, a measurement DB 404, a state management section 406, a filter section 408, a diagnosis object data management section 412, a diagnosis object DB 414, a diagnostic section 416, a statistic processing section 420, a diagnosis result DB 424, and an output filter section 426.

Through those components, the operation diagnostic program 50 processes measurement data sent from the data collector 3 to simultaneously perform parallel operation diagnoses for the plurality of states.

In the operation diagnostic section 52, which is different from the case of the first operation diagnostic program 40 (FIG. 4), basically, a plurality of diagnostic modes or statistic processing modes are not set in the diagnostic section 416 or the statistic processing section 420, and no change occurs in operation conditions of the diagnostic section 416 or the statistic processing section 420.

In each operation diagnostic section 52, for operation diagnosis of each state, n pieces of substates are further defined. In the filter section 408, filter modes #1 (410-1) to #n (410-n) are set corresponding to those substates, and the state management section 406 manages state transition among the substates.

Accordingly, when each of the plurality of operation diagnostic sections 52 operated in parallel is made to be able to perform operation diagnosis for each state, it is possible to define substates different among the plurality of operation diagnostic sections 52 and conflicting substates, and to finely and flexibly perform operation diagnosis of the engine 26.

As examples of substates defined for the operation diagnostic section 52, the followings (1) to (3) can be cited.

(1) "STOP", "IDLE", "NORMAL TRAVELING" and "HIGH-SPEED TRAVELING" set as substates when the operation diagnostic section 52 performs operation diagnosis for a state "TRAVELING" of the engine 26.

(2) "OIL LEVEL HIGH", "OIL LEVEL MIDDLE", and "OIL LEVEL LOW" set as substates when the operation diagnostic section 52 performs operation diagnosis for a state "HIGH-SPEED TRAVELING" of the engine 26.

(3) "OUTSIDE AIR TEMPERATURE HIGH", and "OUTSIDE AIR TEMPERATURE LOW" set as substates when the operation diagnostic section 52 performs operation diagnosis for a state "IDLING" of the engine 26.

Among operations of the components of the second operation diagnostic program 50, operations different from those of the first operation diagnostic program 40 will be described below.

The operations of the components not described below are substantially similar between the first and second operation diagnostic programs 40 and 50.

Figure 13:
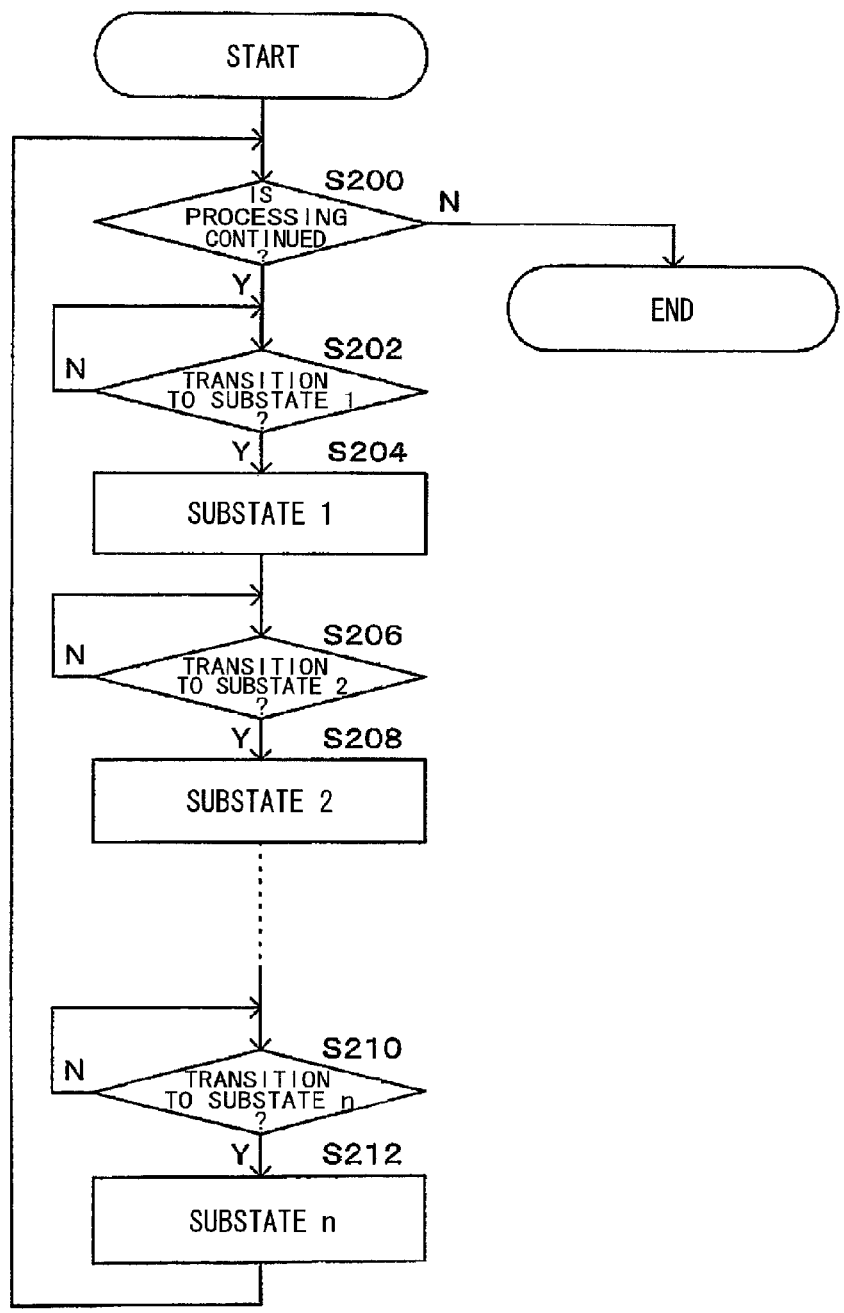
FIG. 13 is a flowchart showing an example of an operation (S20) of the state management section in the second operation diagnostic program shown in FIG. 4.

FIG. 13 is a flowchart showing an example of an operation (S20) of the state management section 406 in the second operation diagnostic program 50 shown in FIG. 4.

In the second operation diagnostic program 50, the state management section 406 determines which of the above-mentioned substates the engine 26 or the like is in based on measurement data from the data collector 3, and switches the filter mode 410 of the filter section 408.

With a case shown in FIG. 13 as a specific example, the operation of the state management section 406 will be further described.

As shown in FIG. 13, in Step 200 (S200), the state management section 406 determines whether to finish processing.

The state management section 406 proceeds to processing of S202 in a case other than the case of finishing the processing.

In Step 202 (S202), the state management section 406 determines whether the measurement data from the data collector 3 satisfies transition conditions to a substate 1.

The state management section 406 proceeds to processing of S204 when the measurement data from the data collector 3 satisfies the transition conditions to the substate 1, but stays in the processing of S202 otherwise.

In Step 204 (S204), the state management section 406 determines that the engine 26 or the like is in the substate 1, and sets the filter section 408 to an operation condition (filter mode 410-1) of the substate 1.

In Step 206 (S206), the state management section 406 determines whether the measurement data from the data collector 3 satisfies transition conditions to a substate 2.

The state management section 406 proceeds to processing of S208 when the measurement data from the data collector 3 satisfies the transition conditions to the substate 2, but stays in the processing of S206 otherwise.

In Step 208 (S208), the state management section 406 determines that the engine 26 or the like is in the substate 2, and sets the filter section 408 to an operation condition (filter mode 410-2) of the substate 2.

Similarly in the following, the state management section 406 determines transition conditions to the substate and executes processing accompanying transition to each substate.

In Step 210 (S210), the state management section 406 determines whether the measurement data from the data collector 3 satisfies transition conditions to the substate n.

The state managements section 406 proceeds to processing of S212 when the measurement data from the data collector 3 satisfies the transition conditions to the substate n, but returns to the processing of S210 otherwise.

In Step 212 (S212), the state management section 406 determines that the engine 26 is in a state n, and sets the filter section 408 to an operation condition (filter mode 410-n) of the state n.

Under control of the state management section 406, in the filter mode 410 set for each substate of the engine 26 or the like, the filter section 408 (FIG. 12) filters measurement data input from the measurement data management section 402.

The filter section 408 outputs the measurement data, which has satisfied the filter mode 410, as diagnosis object data to be used for diagnosis to the diagnosis object data management section 412.

The statistic processing section 420 statistically processes the diagnosis object data input from the diagnosis object data management section 412, and generates diagnosis reference data (FIGS. 8 and 9) for each operation state of the engine 26 to output the data to the diagnostic section 416.

The diagnostic section 416 diagnoses the diagnosis object data input from the diagnosis object data management section 412 by using the diagnosis reference data (FIGS. 8 and 9) input from the statistic processing section 420, and stores and manages a diagnosis result in the diagnosis result DB 424.

The diagnostic section 416 outputs the diagnosis result stored in the diagnosis result DB 424 to the output filter section 426.

[Overall Operation]

Next, an overall operation of the operation diagnostic system 1 to which the second operation diagnostic program 50 is applied will be described below.

Figure 14:
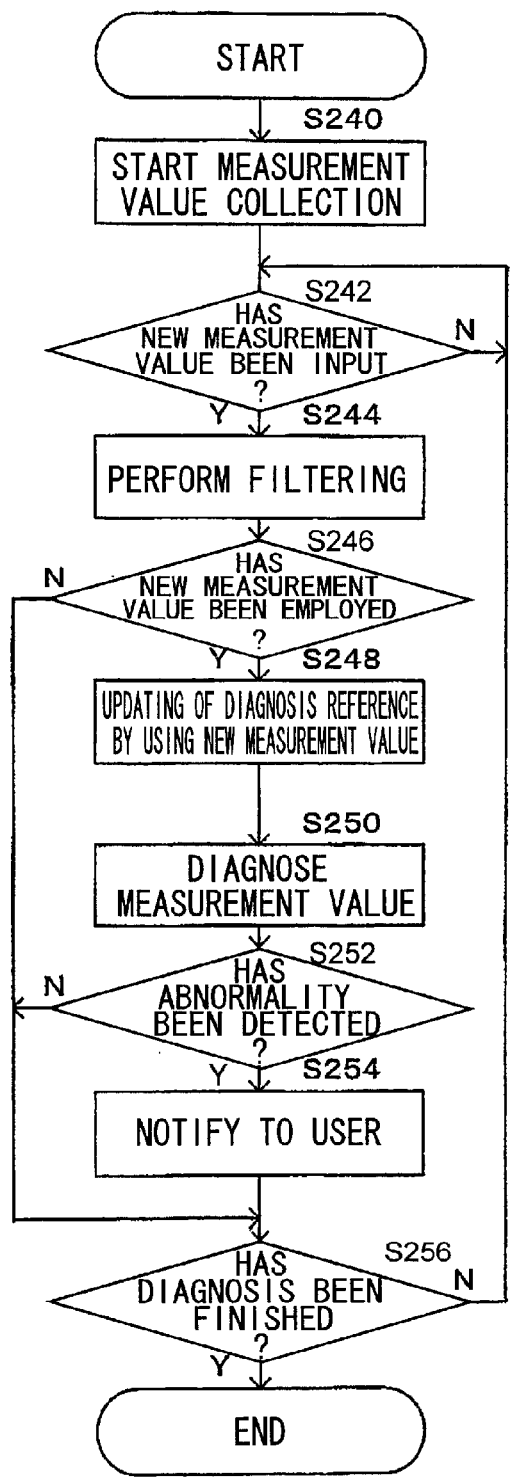
FIG. 14 is a flowchart showing an overall operation (S24) of the operation diagnostic system when there is no transition between substates in each operation diagnostic section (FIG. 12) of the second operation diagnostic program.

FIG. 14 is a flowchart showing the overall operation (S24) of the operation diagnostic system 1 when there is no transition between substates in each operation diagnostic section 52 (FIG. 12) of the second operation diagnostic program 50.

In the drawings below, as in the case of FIG. 10 or the like, a case of updating a diagnosis reference by using m pieces of latest diagnosis object data will be described as a specific example, and processing until collection of m pieces of first diagnosis object data will be omitted.

In Step 240 (S240), the data collector 3 starts collecting various measurement values of the engine 26 (FIG. 1), and sequentially transmits the values as measurement data to the operation diagnostic apparatus 4.

In Step 242 (S242), the measurement data management section 402 (FIG. 4) of each operation diagnostic section 52 of the operation diagnostic program 50 determines whether new measurement data has been input.

Each operation diagnostic section 52 proceeds to S244 if the new measurement data has been input, but stays in the processing of S242 otherwise.

In Step 244 (S244), the filter section 408 filters the input measurement data.

In Step 246 (S246), the diagnosis object data management section 412 determines whether the new measurement data has been employed as diagnosis object data.

The operation diagnostic section 52 proceeds to S248 if the new measurement data has been employed as diagnosis object data, but to processing of S256 otherwise.

In Step 248 (S248), the statistic processing section 420 updates the diagnosis reference data (FIGS. 8 and 9) by using the new diagnosis object data.

In Steps 250 and 252 (S250 and S252), the diagnostic section 416 diagnoses the diagnosis object data based on the diagnosis reference data to determine whether conditions for detecting abnormalities are satisfied.

The operation diagnostic program 52 diagnoses the diagnosis object data, and proceeds to processing of S254 when the conditions for detecting abnormalities are satisfied, but to processing of S256 otherwise.

In Step 254 (S254), the diagnostic section 416 displays an occurrence of an abnormality of the engine 26 and, as occasion demands, the diagnosis result, the measurement data, the diagnosis object data, and the like to the user via the UI section 428 and the I/O unit 106 (FIG. 2).

In Step 256 (S256), the UI section 428 determines whether to finish the diagnosis.

The operation diagnostic section 52 returns to the processing of S242 when the diagnosis is not finished.

Next, the overall operation of the operation diagnostic system 1 when transition occurs between substates in each operation diagnostic section 52 (FIG. 12) will be described.

Figure 15:
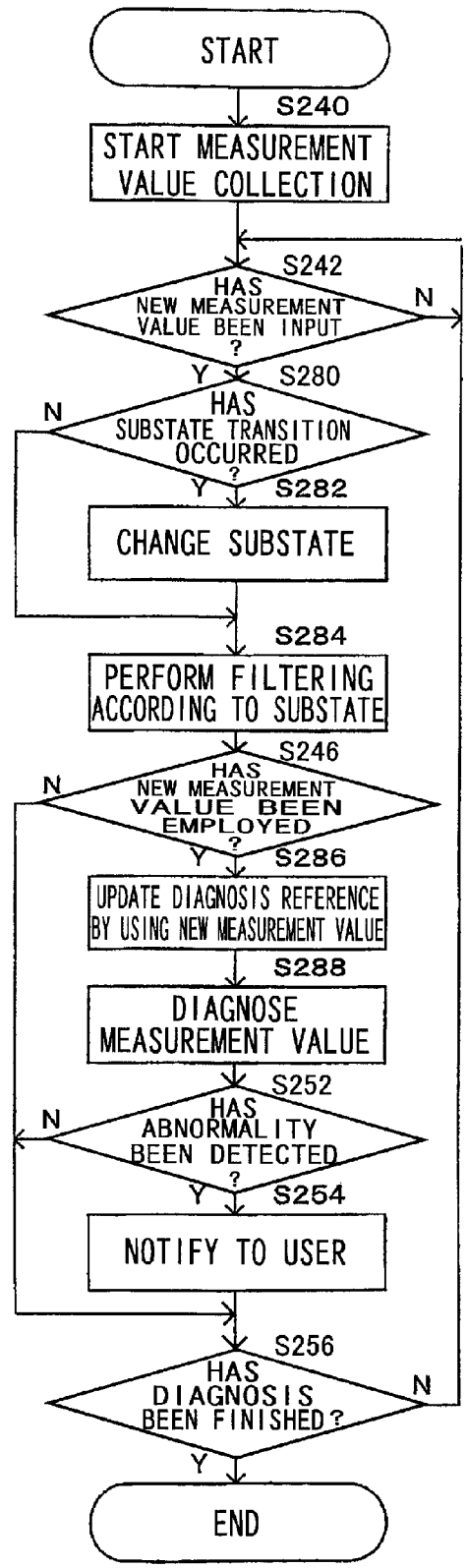
FIG. 15 is a flowchart showing an overall operation (S28) of the operation diagnostic system when transition occurs between states in each operation diagnostic section (FIG. 12) of the second operation diagnostic program.

FIG. 15 is a flowchart showing the overall operation (S28) of the operation diagnostic system 1 when transition occurs between states in each operation diagnostic section 52 (FIG. 12) of the second operation diagnostic program 50.

Among steps shown in FIG. 15, steps substantially similar to those shown in FIG. 14 are denoted by similar reference numerals.

As shown in FIG. 15, in Step 280 (S280), the state management section 406 of each operation diagnostic section 52 determines whether transition has occurred between the substates.

The operation diagnostic section 52 proceeds to processing of S282 if the transition has occurred between the substates, but to processing of S282 otherwise.

In Step 282 (S282), the state management section 406 sets the filter section 408 to perform processing under conditions (filter mode 410) set for the substate of the transition destination.

In Step 284 (S284), according to the set filter mode 410, the filter section 408 filters the input new measurement data.

In Step 286 (S286), the statistic processing section 420 generates diagnosis reference data by using the new measurement value.

In Step 288 (S288), the diagnostic section 416 diagnoses the diagnosis object data by using the generated diagnosis reference data.

INDUSTRIAL APPLICABILITY

The present invention can be used for diagnosing and monitoring an operation or a state change of a measurement object based on a measurement value obtained from the measurement object.

The invention claimed is:

1. A diagnostic apparatus, comprising:
   validity determining means for determining whether a measurement value obtained by time-sequentially measuring a measurement object is valid;
   reference generating means for generating a center value of measurement values determined to be valid as a diagnosis reference used for diagnosing the measurement object each time the measurement value is determined to be valid; and
   diagnosing means for diagnosing the measurement object to be normal when the measurement value is within a predetermined range from the center value of the measurement values which is set according to a passage of measuring time.

2. The diagnostic apparatus according to claim 1, further comprising state determining means for determining a state of the measurement object by using the measurement value determined to be valid, the measurement object changing among a plurality of states,
   wherein the reference generating means generates the diagnosis reference according to the state of the measurement object.

3. The diagnostic apparatus according to claim 1, further comprising state determining means for determining a state of the measurement object by using the measurement value determined to be valid, the measurement object changing among a plurality of states,
   wherein the diagnosing means diagnoses the measurement object according to the state of the measurement object.

4. The diagnostic apparatus according to claim 1,
   wherein the validity determining means determines a measurement value obtained at liming other than predetermined timing, a measurement value inevitably containing an error when the measurement object is measured, and a measurement value taking a value outside a preset range, or a measurement value other than a combination of anyone or more of the measurement values to be valid.

5. The diagnostic apparatus according to claim 1,
   wherein the diagnosing means determines the measurement object to be normal when the measurement value takes a value outside the predetermined range from the center value of the measurement values by a predetermined number of times or more, or by a predetermined frequency or more.

6. A transport machine, comprising:

transporting means for transporting a component to be a measurement object;

validity determining means for determining whether a measurement value obtained by time-sequentially measuring a measurement object is valid;

reference generating means for generating a center value of measurement values determined to be valid as a diagnosis reference used for diagnosis of the measurement object each time the measurement value is determined to be valid; and diagnosing means for diagnosing the measurement object to be normal when the measurement value is within a predetermined range from the center value of the measurement values obtained by a statistic processing which is set according to a passage of measuring time.

7. A diagnostic method, comprising:

determining whether a measurement value obtained by time-sequentially measuring a measurement object is valid;

generating a center value of measurement values determined to be valid as a diagnosis reference used for diagnosis of the measurement object each time the measurement value is determined to be valid; and diagnosing the measurement object to be normal when the measurement value is within a predetermined range from the center value of the measurement values obtained by a statistic processing which is set according to a passage of measuring time.

8. A computer readable medium having stored thereon a program for causing a computer to execute:

a validity determining step of determining whether a measurement value obtained by time-sequentially measuring a measurement object is valid;

a reference generating step of generating a center value of measurement values determined to be valid as a diagnosis reference used for diagnosing the measurement object each time the measurement value is determined to be valid; and a diagnosing step of diagnosing the measurement object to be normal when the measurement value is within a predetermined range from the center value of the measurement values obtained by a statistic processing which is set according to a passage of measuring time.

* * * * *

UNITED STATES PATENT AND TRADEMARK OFFICE
CERTIFICATE OF CORRECTION

PATENT NO. : 7,881,837 B2
APPLICATION NO. : 10/599529
DATED : February 1, 2011
INVENTOR(S) : Masanori Misawa et al.

It is certified that error appears in the above-identified patent and that said Letters Patent is hereby corrected as shown below:

In column 14, line 59, in Claim 4, delete "liming" and insert -- timing --, therefor.

In column 14, line 64, in Claim 4, delete "anyone" and insert -- any one --, therefor.

Signed and Sealed this
Third Day of May, 2011

David J. Kappos
*Director of the United States Patent and Trademark Office*